United States Patent [19]

Wiley

[11] Patent Number: 4,797,661

[45] Date of Patent: Jan. 10, 1989

[54] MOTION SENSING DEVICE

[75] Inventor: Wallace F. Wiley, Prairie Village, Kans.

[73] Assignee: Robert Hooke Memorial Laboratories, Inc., Prairie Village, Kans.

[21] Appl. No.: 91,447

[22] Filed: Aug. 31, 1987

[51] Int. Cl.[4] .......................... G08B 21/00; G01C 9/06; G01P 15/00

[52] U.S. Cl. .......................... 340/664; 33/366; 73/505; 73/516 LM; 73/654; 340/669; 340/689

[58] Field of Search .......................... 340/689, 669, 65, 63, 340/664, 566; 73/516 LM, 505, 654; 33/366; 200/61.47, 52 A; 324/93-94; 307/131

[56] References Cited

U.S. PATENT DOCUMENTS

| | | | |
|---|---|---|---|
| 4,028,815 | 6/1977 | Buckley et al. | 33/366 |
| 4,359,717 | 11/1982 | Huber et al. | 340/669 X |
| 4,378,693 | 4/1983 | Ratcliffe | 340/689 X |
| 4,390,759 | 6/1983 | Scieur | 200/52 A |
| 4,465,074 | 8/1984 | Buchalter | 128/639 |
| 4,468,864 | 9/1984 | Westphal et al. | 33/366 |
| 4,536,755 | 8/1985 | Holzgang et al. | 340/689 X |
| 4,654,977 | 4/1987 | Pakus | 33/366 |
| 4,667,188 | 5/1987 | Schwartz | 340/689 |
| 4,710,757 | 12/1987 | Haase | 340/684 |

OTHER PUBLICATIONS

Data Sheets (7) on Gravity Sensing Electrolytic Transducers, the Fredericks Company, Philmont Avenue and Anne Street, Huntingdon Valley, PA 19006.

P. F-99 of Handbook of Chemistry and Physics, 67th Edition, 1986-1987; Ed.: Weast; CRC Press, Boca Raton, FL.

*Primary Examiner*—Glen R. Swann, III

*Assistant Examiner*—Thomas J. Mullen, Jr.

*Attorney, Agent, or Firm*—Arvid Zuber

[57] ABSTRACT

This invention relates to a device adapted to sensing motion when powered by passage of an electric current between two electrodes that is comprised of a container partially filled with an electrically conductive liquid along with two electrodes in contact with the conductive liquid at least one of which is only partially in contact with said conductive liquid. Motion of the liquid causes a change in resistance between the electrodes which may be detected as a change in current flow. These changes in current flow can be amplified and used to activate an alarm or other signal device.

33 Claims, 2 Drawing Sheets

MOTION SENSING DEVICE

BACKGROUND OF THE INVENTION

This invention relates to a motion sensing device and more particularly, to a device which senses motion through the change in electric current caused by a change in resistance induced by the movement of a conducting liquid.

Motion sensing devices have a wide variety of uses in detecting physical manifestations of force such as shock or impact, change in position, vibration, earthquake, sonic impulses and changes in fluid and solid surfaces. Various means such as diaphragms, piezoelectric crystals and films, position switches such as the mercury switches commonly used in thermostats, pendulums, circuitry that is activated by breakage of a surface, motion detectors of the Doppler type and combinations of such means have been employed to detect one or more of the physical manifestations of motion. It is thus seen that there are a wide variety of uses and applications for motion sensing devices. Prior portable devices have in most cases suffered from being position sensitive, that is, they cannot be placed at an angle, or relatively acute angle, without becoming inoperative.

In the present invention the movement within the device is confined to a liquid; there is no interaction of mechanical parts. Insofar as applicant has been able to determine, there exists no applicable prior art and applicant believes he has invented a unique and novel device for sensing motion.

SUMMARY OF THE INVENTION

Applicant's motion sensing device is a device adapted to sensing motion when powered by passage of electric current between two electrodes and is comprised of a container partially filled with an electrically conductive liquid along with two electrodes in contact with the conductive liquid at least one of which is only partially in contact with said conductive liquid.

The device is powered by an electric current passed between the electrodes, and, the current can either be an alternating current or a direct current; motion of the liquid produces changes in the resistance between the electrodes which are exhibited as changes in the electric current.

BRIEF DESCRIPTION OF THE DRAWING

FIG. 5 is approximately 100,000 ohms. In the device depicted in FIG. 5 the 2000 Hz generator is, suitably, powered by two 9 volt batteries.

Figure 1:
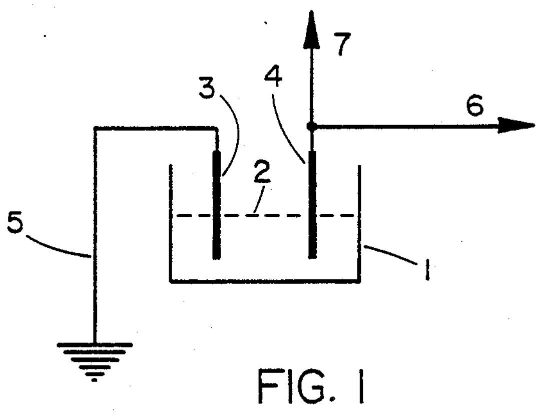
FIG. 1 is a schematic drawing of a simple form of applicant,s variable resistance motion sensing device showing the container, 1, the conducting liquid 2, the electrodes, 3 and 4, the connection to ground, 5, the output, 6, with, 7, representing the connection for a source of electric current.
Figure 2:
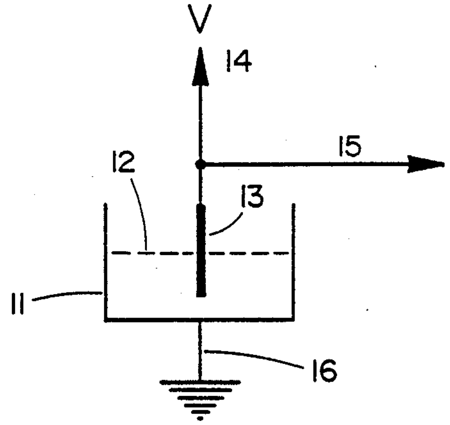
FIG. 2 is a drawing showing a simple form of a preferred embodiment of the invention where the container, 11, serves as an electrode, 12, is the conducting liquid, 13, the second electrode, 14, the connection for electric current, 15, the output and 16, the connection to ground.
Figure 3:
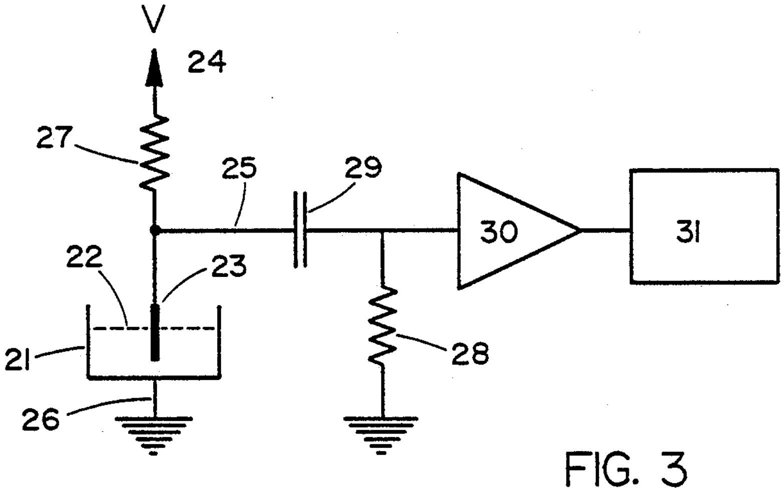
FIG. 3, represents a generalized schematic drawing of a motion sensing device equipped with power source and sensing means showing container electrode, 21, conducting liquid, 22, second electrode, 23, direct current source, 24, output to sensing means 25, connection to ground, 26, resistors, 27, and, 28, capacitor, 29, amplifier, 30, and alarm display or recording means, 31.

As is readily seen from the foregoing brief description of the drawings, the motion detector requires no cooperative mechanical components to generate its signal; likewise, it will readily be seen that the device is inherently long-lived and maintenance-free. Further, though not apparent from the drawings, a satisfactory device can be quite small and need be no larger than, for example, a cylinder one-half inch in diameter and three eighths of an inch high; hence, when used with miniaturized circuits, well-known in the art, the device is small, lightweight and portable. Further, since only a simple tilt of the device changes the resistance, the device responds to a change in angle as it does to other movement, shock or vibration which produces change in the surface of the liquid and change in the area of the electrode or electrodes in contact with the conductive liquid.

It is, therefore, an object of this invention to provide a motion detector which operates by sensing the change in resistance between two electrodes in contact with a conductive liquid.

It is a further object of this invention to provide a motion detector that requires no interacting mechanical components to generate a signal.

It is a still further object of this invention to provide an inherently long-lived, maintenance-free motion detector.

Another object of this invention is to provide a small, lightweight, portable motion detector.

It is even a still further object of this invention to provide a portable automobile burglar alarm system utilizing the motion sensing device as the sensor which activates the system.

Additional objects of this invention will become apparent in the detailed description of his invention and the preferred embodiments which follow.

DETAILED DESCRIPTION

As will be readily understood the principles governing the operation of the variable resistance motion sensing device encompass those which govern the flow of electric current through a resistance and those which control the operation of an electrolytic cell or of a battery.

Although circuitry and sensing means employed with the motion sensing device will differ depending on the nature of the electric current, either alternating or direct current may be used to power the device. An alternating current is the preferred power source.

Since the device operates by producing a change in resistance between the electrodes, the resistance between the electrodes should be high enough that motion of the device will produce an absolute change in resistance great enough to produce a measurable change in voltage when current is passed between the electrodes. Generally, useful devices will have a resistance between electrodes in the range from about 0.1 ohm to about $10^7$ ohms. At the lower limits the change in resistance is more difficult to detect, while at the higher limits, leakage current can become a problem. For such reasons the preferred range of resistance is from about $10^3$ to about $10^6$ ohms with the range from about $5\times10^4$ to $5\times10^5$ ohms being particularly preferred. Motion sensing devices with a resistance between the electrodes of about $10^5$ ohms have shown superior performance characteristics, that is, a response to a force of only 10 dynes.

The resistance between electrodes depends upon a number of design factors. For simplicity, these will be illustrated by discussion of a device comprised of a cylindrical, sealed container with a central cylindrical electrode partially immersed in the conductive liquid, this being the preferred configuration.

The diameter of the central electrode, its depth of immersion and its distance from the container walls all affect the resistance. Generally, resistance increases as the depth of immersion decreases and decreases as the diameter of the central electrode increases. As is well-known, as the distance between electrodes increases the resistance increases; however once the maximum resistance has been reached further distance between the central electrode and the container walls has no significant effect on resistance, all other factors being held constant. Further, as will be readily understood, since the operation of the device depends upon the surface motion of the liquid, minimum immersion will produce the maximum change in resistance with movement of the surface.

The choice of electrode materials depends, in part, on whether alternating or direct current is to be employed in the activation of the device. When direct current is employed the natural electromotive force arising between dissimilar materials will operate with or against the imposed voltage depending upon the choice of anode and cathode and the direction of current flow. Likewise, the electrolytic effects of a direct current will cause changes in the electrodes. Further, on prolonged operations, even under the minor current flows employed in operation of the device, over-voltage and polarization can affect current flow and the performance of the device when it is powered by direct current. However, there is a large body of data and a firm theoretical basis well-known in the art of designing electrolytic cells and batteries applicable to minimizing or eliminating the aforesaid design problems that enables construction of useful motion sensing devices, as herein described, that may be powered by direct current. But, such considerations become a minor factor and have little or no practical effect when the devices are powered by an alternating current. Hence, it is preferred that the devices of this invention be activated by an alternating current. As will be recognized by those skilled in the art, choice of electrodes will play a role in the mitigation or amplification of the electrolytic phenomena which affect performance of the device, and, that with both anode and cathode being made from electrolytically similar or identical metals or materials the role of electrodes in such phenomena can be minimized. For such reasons it is preferred that the anode and cathode be chosen from materials that are in close relation to each other in the electromotive series and it is most preferred that both anode and cathode have approximately the same electrode potential with reference to the standard hydrogen electrode; for example, anode and cathode may be made from the same substance or element. The materials for anode and cathode are preferably selected from the group consisting of aluminum, copper, nickel and zinc and alloys of aluminum, of copper, of nickel and of zinc. For ease of construction and ready availability, brass and copper are especially preferred materials for construction of both anode and cathode, particularly when the container comprises one electrode.

The specific resistance of the conductive liquid should be such that, in combination with the other components, the resistance between the electrodes will be within the ranges set forth above. Generally, the liquid will have a high specific resistance (resistivity). Although liquids with lower resistivities will produce devices with the resistance in the desired range, it is preferred that the specific resistance be of the order of $10^5$ to $10^9$ ohm-cm. Commercial acetone and 95% ethyl alcohol are suitable liquids and devices with resistances in the preferred range are readily constructed with these organic liquids as the conductive liquid. Water also has a resistivity in this range, and, as is well-known the resistivity of pure water can be reduced by the addition of soluble substances. The resistivity of water can thus be adjusted as desired. However, the propensity of water to freeze in low temperatures along with the expansion concommitant with freezing makes water alone unsuitable where low temperatures are encountered, for that reason organic liquids are preferred.

In order that the device be responsive to motion the conductive liquid should be a mobile liquid, that is, a liquid that is set in motion in response to shock or other movement. Generally, such liquids are pourable at room temperature. Further, the term "liquid" is to be understood to include pure liquids, solutions, combinations of liquids including miscible combinations of organic liquids and water and any other substances, materials or combinations thereof that have the properties of a liquid. Although any mobile liquid with the requisite resistivity can be used in the practice of this invention, the preferred liquids have a room temperature viscosity less than about 20 centipoise; liquids with a room temperature viscosity of less than about 2 centipoise are especially preferred. Mobile liquids with a low viscosity index are useful where significant changes in temperature are encountered because of their resistance to change in viscosity with change in temperature.

Selection of a container material will depend upon the design of the device. Where both electrodes are within the container plastic, glass or other material inert to the chemical or solvent action of the conductive liquid is a suitable material. Where the container serves the dual function of container and electrode the container must, of course, be a conductor. Further, since most mobile low viscosity liquids tend to be volatile and to readily evaporate, it is preferred that the container be sealed to prevent loss of the conductive liquid. The configuration and dimensions of the container are not critical. A simple cylinder about one-half inch in diameter and about three-eighths of an inch high is especially preferred. Since one object of the invention is to provide a small, lightweight, portable motion detector the preferred container has no overall dimension greater than about one inch. As noted, suitable configurations of the container are not limited to cylindrical constructions. However, configurations which dampen or otherwise interfere with the mobility of the liquid within the container should be avoided. Although sensitivity to motion can be controlled to some degree by such expedients and mechanical constraints on the movement of the liquid, and, although such expedients and constraints are within the ambit of this invention, sensitivity is more readily controlled by electronic means without interference with the inherent sensitivity of the device.

Although throughout this application applicant speaks of "two electrodes" the term "electrode" is to be understood to mean all elements comprising the anode or the cathode as the case may be. That is, the term "electrode" includes all elements carrying a common charge irrespective of the configuration of the element or element. An "electrode" may have multiple arms, be cylindrical, be comprised of a grid or grids, be the container holding the conducting fluid, etc.

The change in motion may be sensed by any means that detects a change in electric current. As will be readily understood the signal, increase or decrease in current, generated by the device may be amplified by conventioned electronic circuitry so as to generate a signal more readily adapted to triggering an alarm system, activating recording means, or presenting a visual display on a television or oscilloscope screen. Such circuitry also contemplates electronic means or gates whereby the signal or signals generated by the normal motion or motions of a given environment are blocked from the signal means and only abnormal motion or motion superimposed on hhe usual motion or motions activates the signal means.

The voltage by which the device may be activated is not a critical factor; however, as will be readily understood, no advantage is obtained by operating at high voltages. Voltages below 20 volts are adequate. Portable devices are, suitably, powered by two 9 volt batteries. Neither is the frequency of alternating current critical. House current reduced to the practical voltage is usable.

From the foregoing teachings it will be seen that the present invention may be broadly described as a device adopted to sensing motion when powered by passage of an electric current between two electrodes, comprised of a container partially filled with an electrically conductive liquid with two electrodes at least one of which is partially in contact with the conductive liquid.

Thus it may be seen that this invention may be described as a device adapted to sensing motion when powered or activated by passage of an electric current between two electrodes, comprised of a container partially filled with a mobile, conductive liquid and two electrodes in contact with said conductive liquid with at least one of said electrodes being only partially in contact with said conductive liquid.

The invention may also be described as a device adapted to sensing motion when activated by passage of an electric current between two electrodes, comprised of a cylindrical sealed container providing one of two electrodes, the second electrode being a centrally positioned cylindrical wire partially immersed in said conductive liquid, both electrodes being made of the same material, with the resistance between said electrodes being in the range of from about 0.1 ohm to about $10^7$ ohms In still another aspect it may be described as a device adapted to sensing motion when activated or powered by an electric current between two electrodes comprised of a cylindrical, sealed container partially filled with a conductive liquid with a specific resistance of from about $10^6$ to $10^8$ ohm-cm and a viscosity not greater than about 2 centipoise, said container providing one of two electrodes, the second electrode being a centrally positioned cylindrical wire with a diameter not greater than about one-eighth of an inch, the second electrode being only partially immersed in said conductive liquid, the electrodes being made from a material selected from the group consisting of aluminum, copper, nickel and zinc and of alloys of aluminum, of copper, of nickel and of zinc, and, where the resistance between the electrodes is from about $10^3$ to $10^6$ ohms.

The present invention also encompasses the motion sensing device in combination with an appropriate power source and sensing means. Thus the invention, in another aspect may be described as a motion sensing device comprised of a container partially filled with an electrically conductive liquid, two electrodes, at least one of which is only partially in contact with said conductive liquid, means for passing a flow of electric current between said electrodes and means for sensing the change in electric current when the resistance between the electrodes is changed by movement of the conductive liquid.

Figure 4:
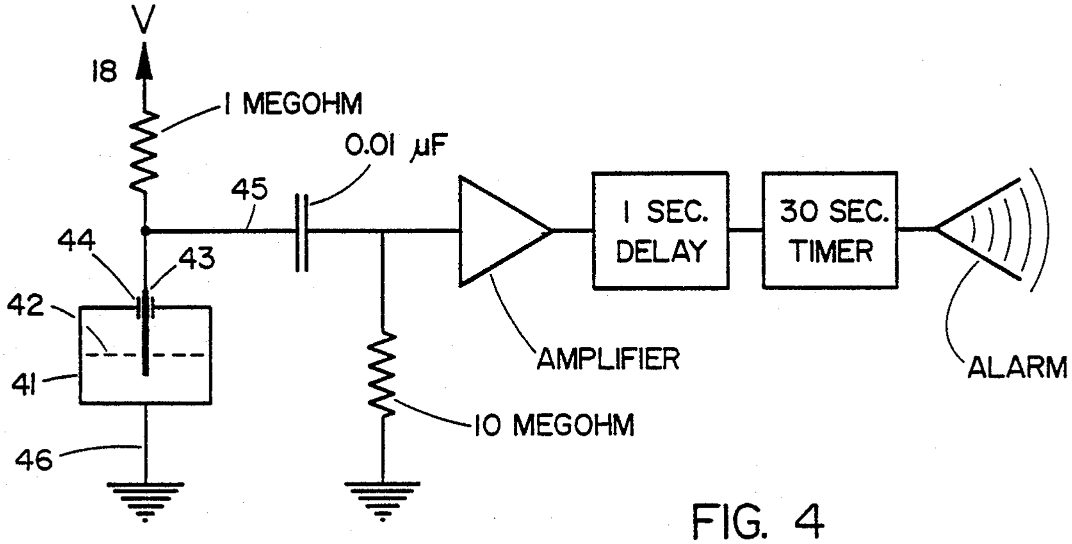
FIG. 4, is a schematic representation of an alarm system used in an embodiment of the invention pertaining to a portable alarm system to be used, for example as an automobile anti-theft or anti-vandalism device. The diagram illustrates appropriate values for the resistors, capacitors and imposed voltage. In this FIG. 4, the container, 41, is sealed, 42, represents the conducting liquid, 43, the internal electrode, 44, the insulator which isolates the internal electrode from the container, 45, the output to the sensing means, and, 46, the connection to ground. The output is fed to the amplifier, its signal is subjected to a 1 sec. delay to activate the device before triggering the alarm and a 30 second timer which controls the length of the alarm signal when it is activated by movement of the container, 41, and the conducting liquid, 42.
Figure 5:
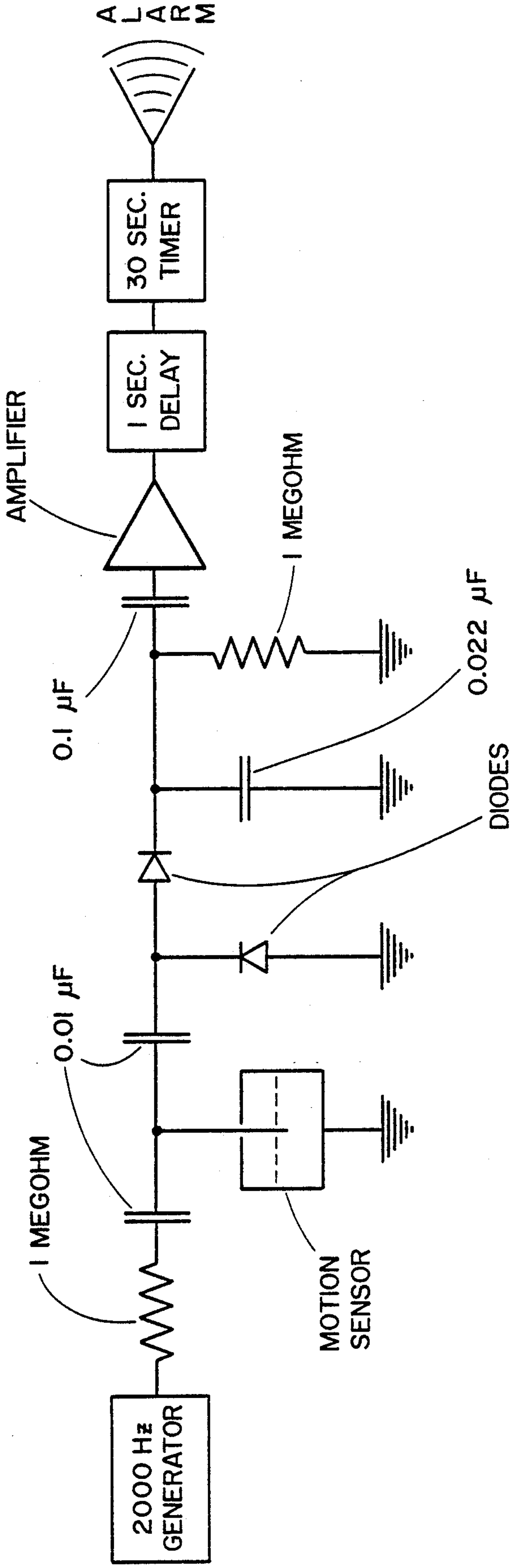
FIG. 5, is a diagram of the circuitry employed for a motion sensing device used as an automobile burglar alarm. It should be noted that the internal resistance, that is, the resistance between the electrodes in both FIG. 4

In a still further embodiment, the invention includes a signal system, such as an alarm, display or recording system wherein one or more of the motion sensing devices described herein is employed to activate such system. In such case the invention includes a motion sensing device as herein described along with means for powering or activating the device, means for sensing the change in electrical current caused by motion of the device, signal means, and means for activating the signal means. As will be understood by those skilled in the art, such sensing means can include amplification of the change in current caused by motion of the device, electronic "gates" to control the signal required to activate the signal means, and such delays or timers as may be needed to permit activation of the system without activating the signal means. It will also be understood that the sensing means and means for activating the signal may be combined within one circuit. In particular, the power and sensing means depicted in FIGS. 4 and 5 are applicable to a portable automobile burglar alarm.

Other aspects of the invention may be discerned by reference to the foregoing illustrative discussion.

What is claimed is:

1. A device adapted to sensing motion when activated by passage of an electric current between two electrodes comprised of a container partially filled with a mobile, conductive liquid and first and second electrodes in contact with said conductive liquid with at least said second electrode being partially immersed in said conductive liquid, the immersed portion of said second electrode receiving the electric current from above the surface of the liquid through a resistor.

2. The device of claim 1 wherein the resistance between said electrodes is from about 0.1 ohm to about $10^7$ ohms.

3. The device of claim 1 wherein the container is a sealed container and the resistance between said electrodes is from about 0.1 ohm to about $10^7$ ohms.

4. The device of claim 1 wherein the container is a sealed container, both electrodes are made of the same material and the resistance between said electrodes is from about 0.1 ohm to about $10^7$ ohms.

5. The device of claim 1 wherein the container is cylindrical, the container is sealed, both electrodes are made of the same material and the resistance between said electrodes is from about 0.1 ohm to about $10^7$ ohms.

6. The device of claim 1 wherein the container is cylindrical, the container is sealed, both electrodes are made of the same material, one electrode is centrally located within the container and partially immersed in the conductive liquid and the resistance between said electrodes is from about 0.1 ohm to about $10^7$ ohms.

7. The device of claim 1 wherein the container provides one electrode and the resistance between said electrodes is from about 0.1 ohm to about $10^7$ ohms.

8. The device of claim 1 wherein the container provides one electrode, the container is cylindrical and the resistance between said electrodes is from about 0.1 ohm to about $10^7$ ohms.

9. The device of claim 1 wherein the container provides one electrode, the container is cylindrical, the container is sealed and the resistance between said electrodes is from about 0.1 ohm to about $10^7$ ohms.

10. The device of claim 1 wherein the container provides one electrode, the container is cylindrical, the container is sealed, both electrodes are made of the same material and the resistance between said electrodes is from about 0.1 ohm to about $10^7$ ohms.

11. The device of claim 1 wherein the container provides one electrode, the container is cylindrical, the container is sealed, both electrodes are made of the same material, one electrode is centrally located within the container and partially immersed in said conductive liquid and the resistance between said electrodes is from about 0.1 ohm to about $10^7$ ohms.

12. A device adapted to sensing motion when activated by passage of an electric current between two electrodes comprised of a cylindrical, sealed container partially filled with a mobile, conductive liquid, said container providing one of two electrodes, the second electrode being a centrally positioned cylindrical wire partially immersed in said conductive liquid, the immersed portion of said second electrode receiving the electric current from above the surface of the liquid through a resistor both electrodes being made of the same material, with the resistance between said electrodes being in the range of from about $10^3$ ohms to about $10^6$ ohms.

13. The device of claim 12 wherein the conductive liquid has a specific resistance of from about $10^4$ to $10^9$ ohms-cm and a viscosity not greater than about 20 centipoise and the wire has a diameter not greater than about one-eighth of an inch.

14. The device of claim 12 wherein the conductive liquid has a specific resistance of from about $10^4$ to $10^9$ ohms-cm and a viscosity not greater than about 2 centipoise and the wire has a diameter not greater than about one-eighth of an inch.

15. The device of claim 12 wherein the conductive liquid has a specific resistance of from about $10^4$ to $10^9$ ohms-cm and a viscosity not greater than about 20 centipoise, the wire has a diameter not greater than about one-eighth of an inch and the resistance between the electrodes is from about $5\times10^4$ ohms to about $5\times10^5$ ohms.

16. The device of claim 12 wherein the conductive liquid has a specific resistance of from about $10^6$ to $10^8$ ohm-cm and a viscosity not greater than about 20 centipoise and the wire has a diameter not greater than about one-eighth of an inch.

17. The device of claim 12 wherein the conductive liquid has a specific resistance of from about $10^6$ to $10^8$ ohm-cm and a viscosity not greater than about 2 centipoise and the wire has a diameter not greater than about one-eighth of an inch.

18. The device of claim 12 wherein the conductive liquid has a specific resistance of from about $10^6$ to $10^8$ ohm-cm and a viscosity not greater than about 2 centipoise, the wire has a diameter not greater than about one-eighth of an inch and the resistance between electrodes is from about $5\times10^4$ to $5\times10^5$ ohms.

19. A device adapted to sensing motion when activated by passage of an electric current between two electrodes comprised of a cylindrical, sealed container partially filled with a mobile, conductive liquid with a specific resistance of from about $10^6$ to $10^8$ ohm-cm and a viscosity not greater than about 2 centipoise, said container providing one or two electrodes, the second electrode being a centrally positioned cylindrical wire with a diameter not greater than about one-eighth of an inch, the second electrode being only partially immersed in said conductive liquid, and the immersed portion of said second electrode receiving the electric current from above the surface of the liquid through a resistor the electrodes being made of a material selected from the group consisting of aluminum, copper, nickel and zinc and alloys of aluminum, of copper, of nickel and of zinc, and, where the resistance between the electrodes is from about $10^3$ to $10^6$ ohms.

20. The device of claim 19 wherein the resistance between the electrodes is from about $5\times10^4$ to about $10^5$ ohms.

21. The device of claim 19 wherein both electrodes are made of the same material.

22. The device of claim I9 wherein no dimension of the container is greater than about 1 inch.

23. The device of claim 19 wherein the electrodes are made of copper.

24. The device of claim 19 wherein the electrodes are made of brass.

25. The device of claim 19 wherein no dimension of the container is greater than about one inch, and both electrodes are made of the same material.

26. The device of claim 19 wherein no dimension of the container is greater than about 1 inch, and both electrodes are made of brass.

27. The device of claim 19 wherein no dimension of the container is greater than about 1 inch, and both electrodes are made of copper.

28. The device of claim 19 wherein no dimension of the container is greater than about one inch, both electrodes are made of brass, and the conductive liquid is commercial acetone.

29. The device of claim 19 wherein no dimension of the container is greater than about one inch, both electrodes are made of copper and the conductive liquid is commercial acetone.

30. The device of claim 19 wherein no dimension of the container is greater than about one inch, both electrodes are made of brass and the conductive liquid is 95% ethanol.

31. The device of claim 19 wherein no dimension of the container is greater than about one inch, both electrodes are made of copper and the conductive liquid is 95% ethanol.

32. A device adapted to sensing motion when activated by passing of an electric current between two electrodes comprised of a container partially filled with a mobile, conductive liquid and first and second electrodes in contact with said conductive liquid with at least said second electrode only partially immersed in said conductive liquid, the immersed portion of said second electrode receiving the electric current from above the surface of the liquid through a resistor and with the resistance between said electrodes being in the range from about 0.1 ohm to about $10^7$ ohms, means for passing an electric current through said electrodes, means for sensing the change in electric current when the resistance between the electrodes is changed by motion of the conductive liquid, signal means, and means for activating said signal means when the change in resistance is sensed by the sensing means.

33. The signal system of claim 32 wherein the motion sensing device is comprised of a cylindrical, sealed container partially filled with a conductive liquid with a specific resistance in the range from about $10^6$ to $10^8$ ohm-cm and a viscosity not greater than about 2 centipoise, said container providing one of two electrodes, the second electrode being a centrally positioned cylindrical wire with diameter not greater than about one-eighth of an inch, the second electrode being only partially immersed in said conductive liquid, the electrodes being made from a material selected from the group consisting of aluminum, copper, nickel and zinc and alloys of aluminum, of copper, of nickel and of zinc, both electrodes being made from the same material, and, where the resistance between the electrodes is about 100,000 ohms, means for passing a flow of electric current through said electrodes, means for sensing the change in electric current when the resistance between the electrodes is changed by motion of the conductive liquid, signal means, and means for activating said signal means when the change in resistance is sensed by the sensing means.

* * * * *